May 14, 1968 I. W. GRUNDIN ET AL 3,383,471

SWITCHING SYSTEM FOR ESTABLISHING CONNECTIONS BETWEEN TRANSMISSION LINES IN TELECOMMUNICATION SYSTEMS OR THE LIKE

Filed Sept. 18, 1964 9 Sheets-Sheet 1

INVENTORS
IVAN WITALIS GRUNDIN
KARL ARNE ANULF
CARL ALFRED BERGLUND

BY Strauch, Nolan, Neale, Nies & Kurz

ATTORNEYS

INVENTORS
IVAN WITALIS GRUNDIN
KARL ARNE ANULF
CARL ALFRED BERGLUND

BY Strauch, Nolan, Neale, Nies & Kurz
ATTORNEYS

SWITCHING SYSTEM FOR ESTABLISHING CONNECTIONS BETWEEN TRANSMISSION LINES IN TELECOMMUNICATION SYSTEMS OR THE LIKE

Filed Sept. 18, 1964 9 Sheets-Sheet 3

INVENTORS
IVAN WITALIS GRUNDIN
KARL ARNE ANULF
CARL ALFRED BERGLUND
BY Strauch, Nolan, Neale, Nies & Kurz
ATTORNEYS

INVENTORS
IVAN WITALIS GRUNDIN
KARL ARNE ANULF
CARL ALFRED BERGLUND

BY Strauch, Nolan, Neale, Nies & Kurz
ATTORNEYS

INVENTORS
IVAN WITALIS GRUNDIN
KARL ARNE ANULF
CARL ALFRED BERGLUND

BY Strauch, Nolan, Neale, Nies & Kurz
ATTORNEYS

SWITCHING SYSTEM FOR ESTABLISHING CONNECTIONS BETWEEN TRANSMISSION LINES IN TELECOMMUNICATION SYSTEMS OR THE LIKE

Filed Sept. 18, 1964 9 Sheets-Sheet 6

INVENTORS
IVAN WITALIS GRUNDIN
KARL ARNE ANULF
CARL ALFRED BERGLUND
BY Strauch, Nolan, Neale, Nies & Kurz
ATTORNEYS

CA

DA

INVENTORS
IVAN WITALIS GRUNDIN
KARL ARNE ANULF
CARL ALFRED BERGLUND

BY Strauch, Nolan, Neale, Nies & Kurz
ATTORNEYS

SWITCHING SYSTEM FOR ESTABLISHING CONNECTIONS BETWEEN TRANSMISSION LINES IN TELECOMMUNICATION SYSTEMS OR THE LIKE

Filed Sept. 18, 1964 9 Sheets-Sheet 8

INVENTORS
IVAN WITALIS GRUNDIN
KARL ARNE ANULF
CARL ALFRED BERGLUND

BY Strauch, Nolan, Neale, Nies & Kurz
ATTORNEYS

INVENTORS
IVAN WITALIS GRUNDIN
KARL ARNE ANULF
CARL ALFRED BERGLUND

BY Strauch, Nolan, Neale, Nies & Kurz
ATTORNEYS

United States Patent Office 3,383,471
Patented May 14, 1968

3,383,471

SWITCHING SYSTEM FOR ESTABLISHING CONNECTIONS BETWEEN TRANSMISSION LINES IN TELECOMMUNICATION SYSTEMS OR THE LIKE

Ivan Witalis Grundin, Upplandsgatan 17, Stockholm, Sweden, Karl Arne Anulf, Granbacken 1, Näsbypark, Sweden, and Carl Alfred Berglund, Spelvagen 11, Trangsund, Sweden Filed Sept. 18, 1964, Ser. No. 397,563
9 Claims. (Cl. 179—18)

ABSTRACT OF THE DISCLOSURE

A switching system for connecting transmission lines comprising plural selector stages divided into two-stage groups. The stages are interconnected and certain stages are also connectable to incoming and outgoing lines. Incoming-outgoing line connections are completed through the selector stages by control circuitry which selects at least one idle outgoing line, a connection to the associated selector stage from the incoming line or lines, and available connections in the intervening selector stages. Circuitry responsive solely to the selector stages in which connections are marked completes the selected route from the incoming line through the selector stages to the outgoing line.

The invention relates to an automatic switching system for telephone and telegraph exchanges and provides a novel system for establishing connections through the switches.

In the present switching systems and particularly in large switching centres switching and routing is effected by means of a plurality of selector stages, for example line finder, first, second and third group selectors, and final selector, as illustrated in FIGURES 1–3 in the accompanying drawings. Operation of the various stages is controlled either directly, for instance by controlling the separate switching means over the speech wires from the dial of the subscriber's station, or by means of so called registers. In the latter case the selector stages are operated either by signals sent over the speech wires directly to each selector stage (FIGURE 1) or to control means, for instance markers, which are common to a number of group selectors (FIGURE 2), or by means of signals sent over a by-path to a group of selectors (FIGURE 3). After translating the received information the register transmits control signals successively to the selector stages, thereby causing operation of the switching means in the various stages. The connections are completed when the last selector stage has been operated.

The switching systems may be provided with individual markers for the selector stages (as shown in FIGURES 2 and 3 in the accompanying drawings) or they may be provided with a common central marker which cooperates with the register to control the operation of the switches over special by-paths. The necessary translation is usually effected in the register, while testing and switching functions are controlled from the marker.

It is a common characteristic of these known systems that they have separate groups, means or selectors for different categories of traffic and for different traffic directions, and that the operation of the selectors is controlled by signals from means outside the selector equipment.

In a system built up in accordance with the present invention the selectors themselves control the setting up of a connection without the aid of any control signals from the register and only under control of information on the incoming line and the outgoing line or group of outgoing lines which are to take part in the connection. The connection can be extended over several selectors connected in series and preferably interconnected by means of a so called link system. Thus, it is a feature of the invention that the selector system includes a plurality of selector stages, each stage comprising control means for controlling the respective selector stage. The said control means in cooperation with marker means which connect available lines or links, are operable to select and set up a connecting path through the selector system according to the position of the calling line in the primary selector stage and the position of the serviceable outgoing lines in the secondary selector stages.

The invention makes it possible to utilize the multiples of the selectors in common for all traffic routes, and therefore the size of the equipment is determined by the total traffic intensity. In prior switching systems having the selectors divided into groups each group must be dimensioned to meet the maximum traffic intensity in that group. Since the maximum traffic intensity is not liable to occur simultaneously in all the groups, this arrangement is considerably less economical as compared with the system of the present invention. Also the selector groups in the prior systems are comparatively small, and therefore the traffic intensity for each incoming line cannot be as large as in the system according to the present invention.

Since the register equipment does not need to perform any complicated translation of the received information or to send signals to the selectors for their operation, the register equipment can be considerably simplified and principally has to comprise storage (memory) means only. Since the switching operations for setting up a connection take place simultaneously and instantaneously in the separate selector stages, the time required for setting up a connection is considerably reduced. Therefore, the amount of equipment needed in a system according to the invention is considerably less than in prior systems. Due to the rapid completion of a connection the speed of operation of a telephone system incorporating the invention becomes considerably larger than in prior systems.

The invention will be described more in particular with reference to the accompanying drawings.

In the figures only such parts and circuits are shown as are necessary to explain the invention.

Figure 1:
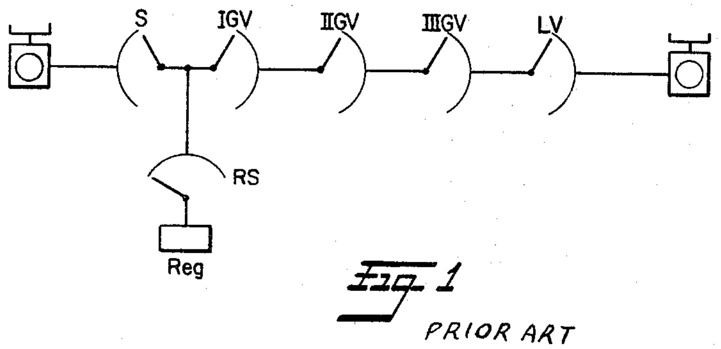
FIG. 1 PRIOR ART
FIGURES 1 to 3 show skeleton diagrams of known telephone switching systems. These figures have been included in order that the differences between the old systems and the system according to the invention shall appear more clearly.
Figure 2:
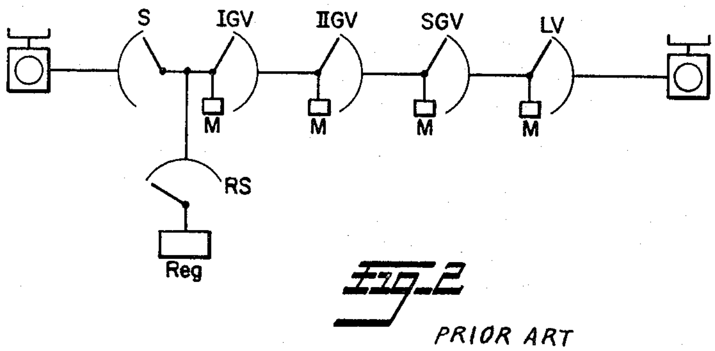
FIG. 2 PRIOR ART
Figure 3:
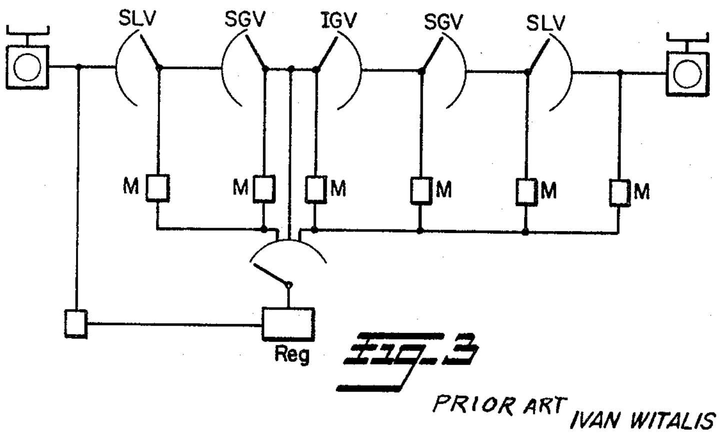
FIG. 3 PRIOR ART
Figure 4:
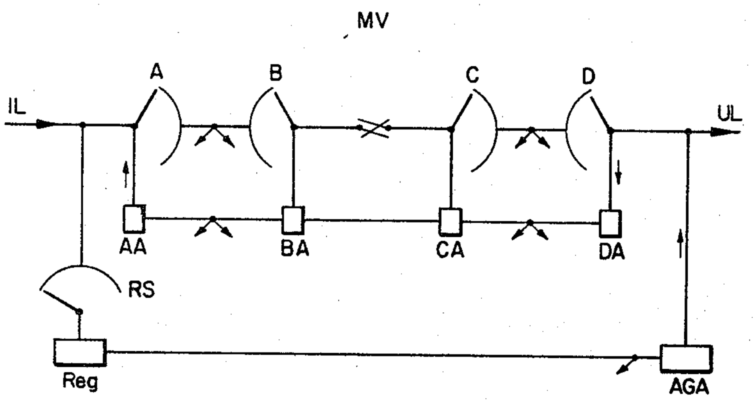
FIGURE 4 is a trunking diagram for a switching system incorporating the present invention. The selector system shown in FIGURE 4 corresponds to the group selector stages (IGV, IIGV, IIIG, SGV) in the prior systems shown in FIGURES 1 to 3.

The selector shown in FIGURE 4 comprises four series connected partial selectors. The partial selectors consist of individual switch units (vertical units) in switches of the crossbar type. The incoming lines IL are connected to the contact bars in switches in the A-stage, and the outgoing lines are connected to switches in the D-stage.

Of course the lines may also be connected to the multiple side of the switches, and in such case the lines may be multiple-connected to several switches. The test wires of the lines belonging to each outlet are connected to address group relays which are individual to each group. Several relays of this kind may be included in an address group, and therefore the number of outgoing lines in each group is optional. The contact bars of the switches in the B- and C-stages are interconnected in pairs. The interconnection of the contact bars is preferably a so called shift-order connection as indicated at $x$ in FIGURES 5 and 7. The same system of connection may also be used for the incoming and outgoing lines.

The multiple of the switches (vertical units of crossbar switches) in the A-stage is linked to a number of points in the multiple of the B-stage. In analogous manner the multiple in the C-stage is linked to the multiple of the D-stage. The links between the A- and B-stages and between the C- and D-stages are normally connected to a plurality of multiple points in both of the linked stages (A- and B-stage and C- and D-stage respectively). This multiplication is indicated at $y$ in FIGURES 5 and 7. By increasing or decreasing this multiplication the traffic handling capacity and availability in the system can be regulated at will. For each selector stage there is provided a control equipment, AA, BA, CA and DA respectively, by means of which the selection of connecting path through the respective selector stages is controlled.

RS is an ordinary register finder for connecting a register to the incoming line, and REG is a register which contains information receiving and storing means.

The relay set designated AGA is an address group indicator which marks the serviceable lines in the D-stage after having received information on the identity of the wanted line group from the register.

The operation of the system in setting up a connection is broadly as follows.

An incoming line IL is connected in known manner over the register finder RS to the register REG. After the register has received the information necessary to identify the wanted destination of the call the register seizes the address group indicator AGA and sends information to AGA on the outgoing line group over which the connection is to be extended. Simultaneously the register marks the selected inlet in the A-stage, and the relay set AGA applies start marking in the D-stage to all idle lines in the group over which the connection is to be extended. In the B- and C-stages a marking is hereby applied to all links that may be used for the wanted connection, whereupon selection of the first idle link and line is effected instantaneously. When the connection through the selector has been completed, and the register has been connected to an idle outgoing line in the D-stage, the relay set AGA is released, and then the relay set AGA and the control circuits for the partial selector stages are free to set up another connection.

Figure 5:
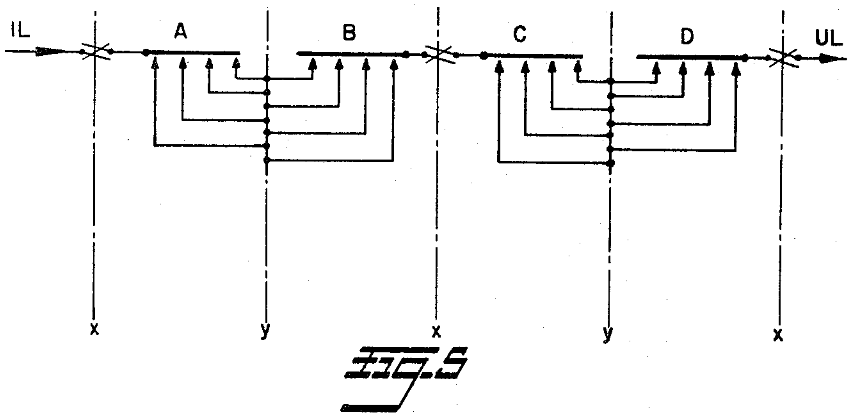
FIGURE 5 shows the multiple arrangement for the system of FIGURE 4.
Figures 6, 7:
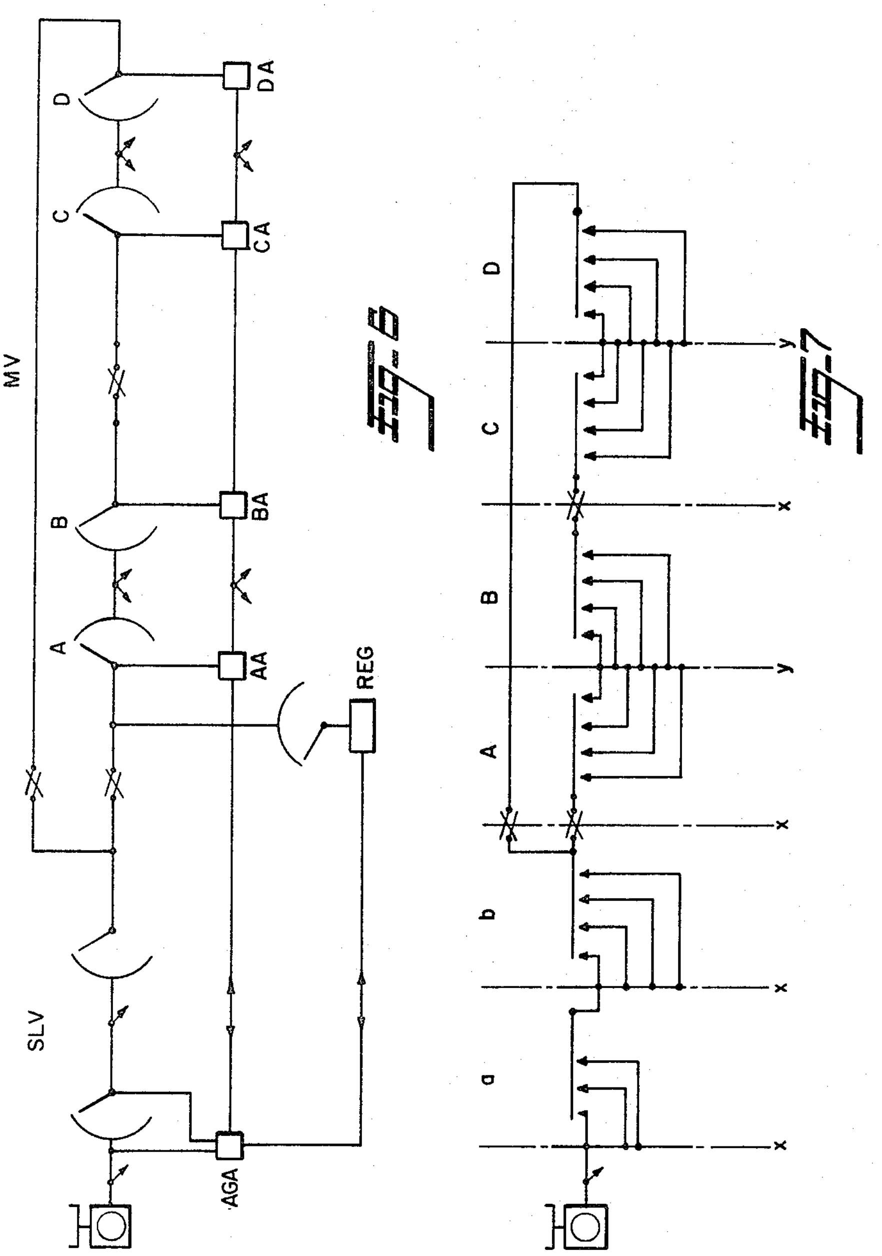
FIGURE 6 shows the trunking scheme for a complete telephone exchange embodying the invention.
FIGURE 7 shows the multiple arrangement of the system of FIGURE 6.

The operation of the system according to the invention as applied to an automatic telephone exchange as shown in FIGURES 4 and 5 will now be described in greater detail with reference to FIGURES 8 to 21. The described selector, here called intermediate selector MV, corresponds as regards its function to all the group selector stages in a conventional system.

Figures 8, 9:
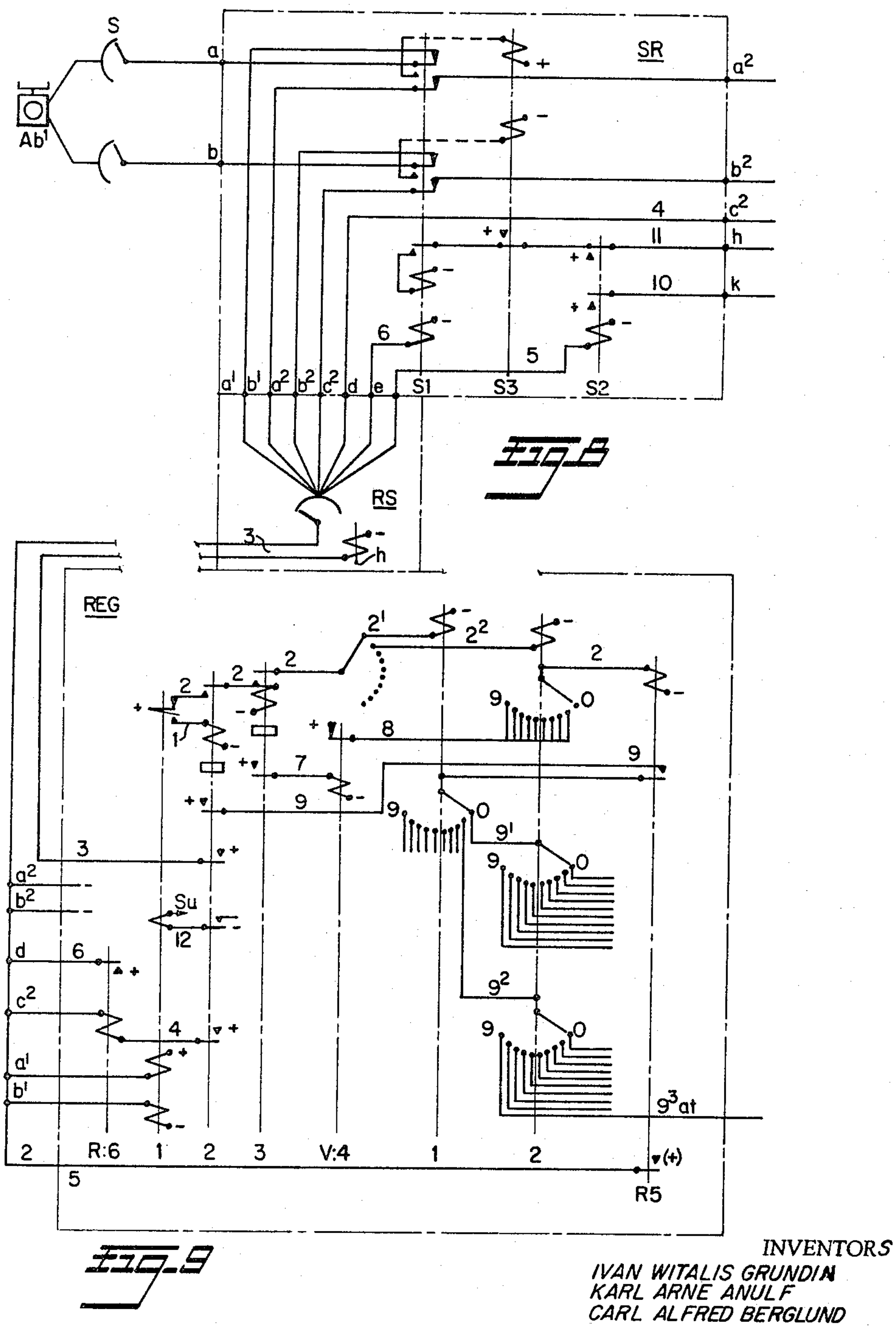
FIGURE 8 shows a linder finder, cord circuit and register finder for the system of FIGURES 4 and 5.
FIGURE 9 shows a register for the system of FIGURES 4 and 5.

FIGURE 8 shows schematically an ordinary line finder S, a register finder RS and a cord circuit (connecting circuit) SR. FIGURE 9 shows the register REG.

The line finder for connecting the subscriber's line to the cord circuit may be of any known design and has been indicated only symbolically. In the cord circuit there is shown a connecting relay S1, a start relay S2 and a current feed and holding relay S3.

The register finder RS (FIGURE 8) can be of any known design and is shown only in skeleton form. The register REG (FIGURE 9 )contains the information receiving relays R1, R2 and R3, the information receiving digit storage devices V1 and V2, the switch V4 for connecting the digit storage devices, the selector start relay R5 and the connecting relay R6.

Figures 10, 11, 12:
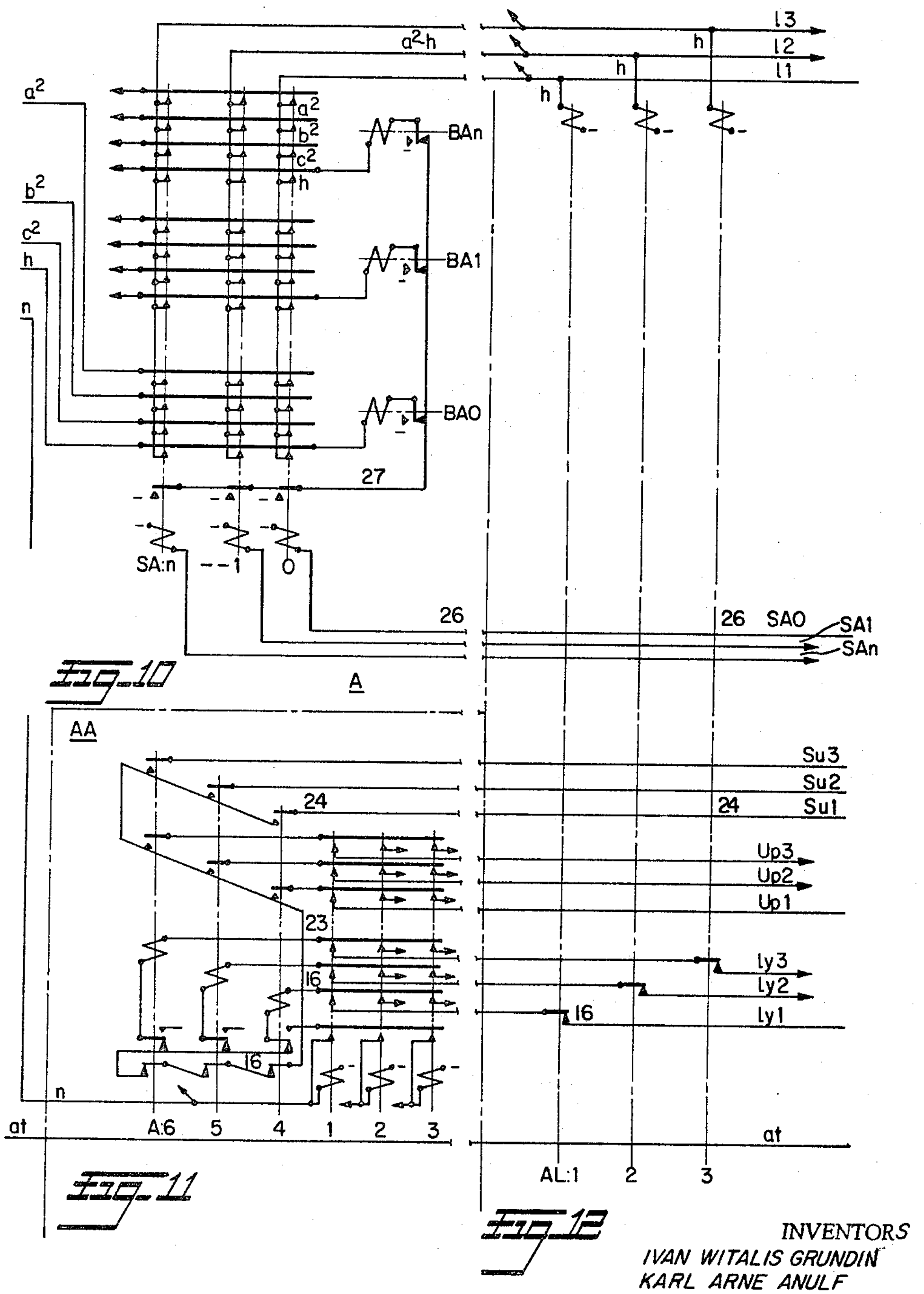

FIGURES 10, 11 and 12 show the A-stage of the selector which comprises switches of the crossbar type, marking relays A1–A3, lock-out relays A4–A6 and link marking relays AL1–AL3.

Figure 13:
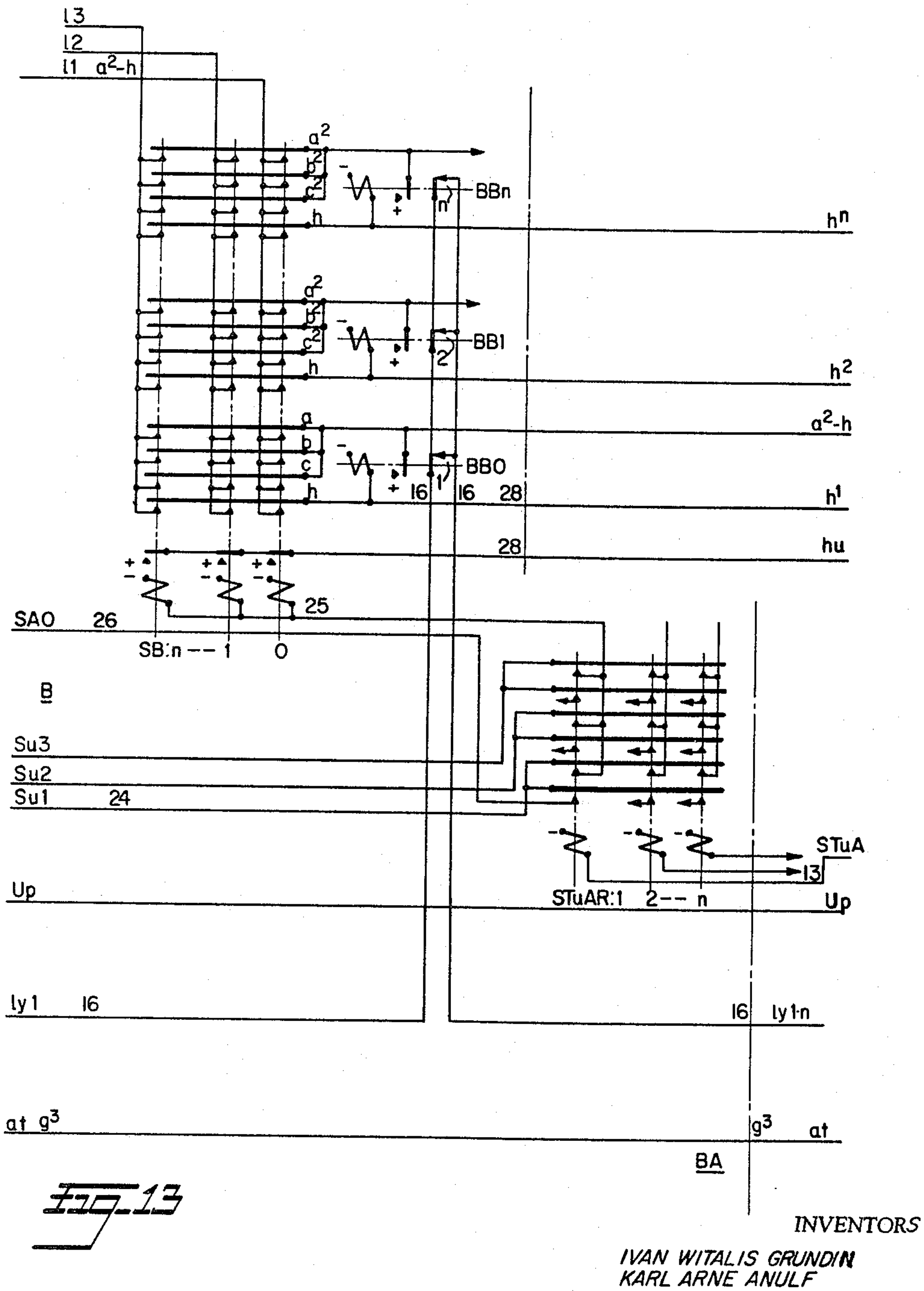
FIGURES 10 to 21 show the selectors and associated equipment for the system of FIGURES 4 and 5.

FIGURE 13 shows the B-stage of the selector including the relays STuAR1–$n$ for selecting the select magnets of the crossbar switches.

Figures 14, 15, 16:
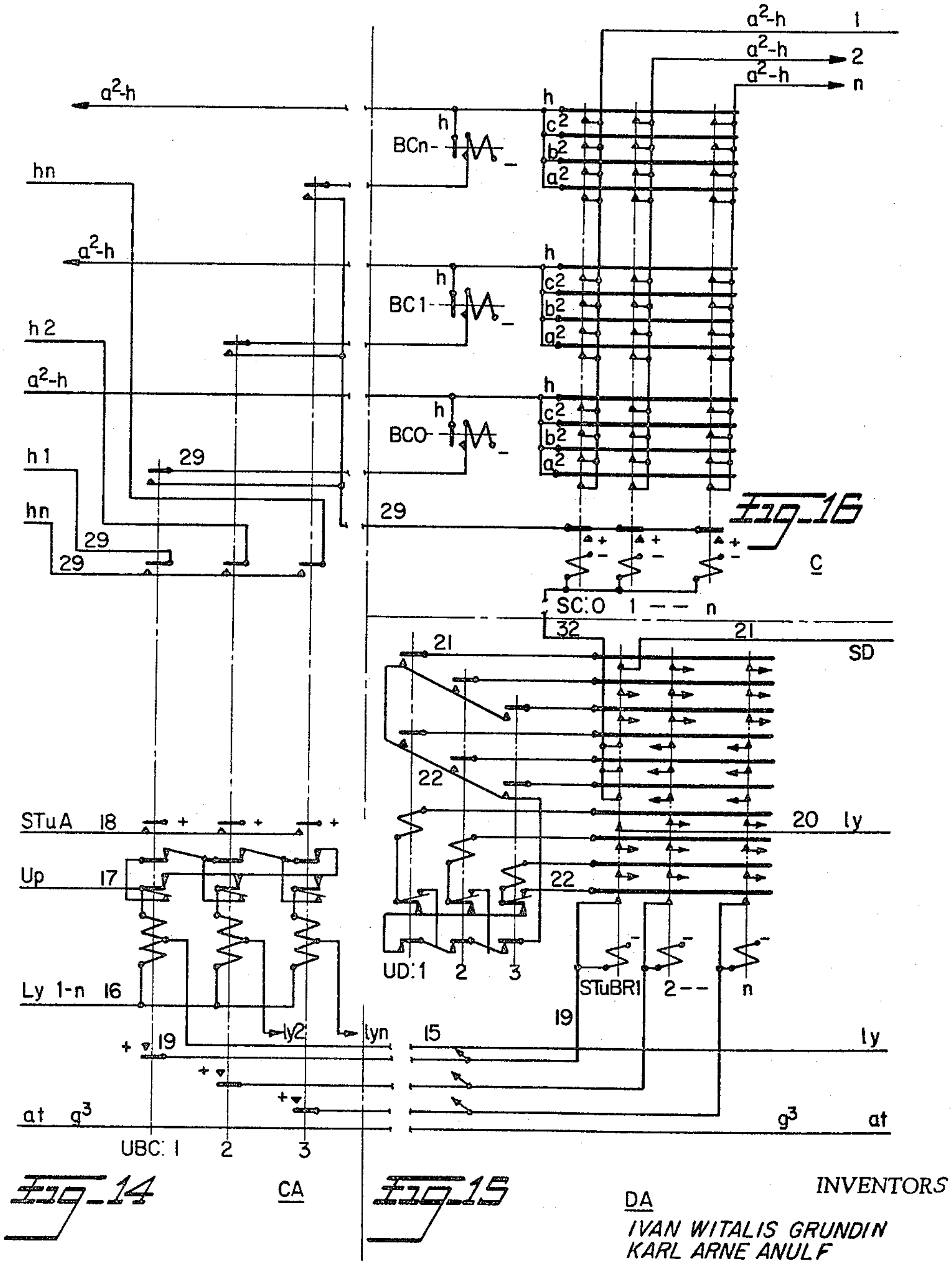

FIGURE 16 shows the C-stage of the selector. FIGURE 15 shows the relays STuBR1–$n$ for selecting the select magnets of the crossbar switches in the C-stage and lock-out relays UD for selecting a switch in the D-stage. FIGURE 14 shows lock-out relays UBC for selecting links between the B- and C-stages.

Figures 17, 18, 19:
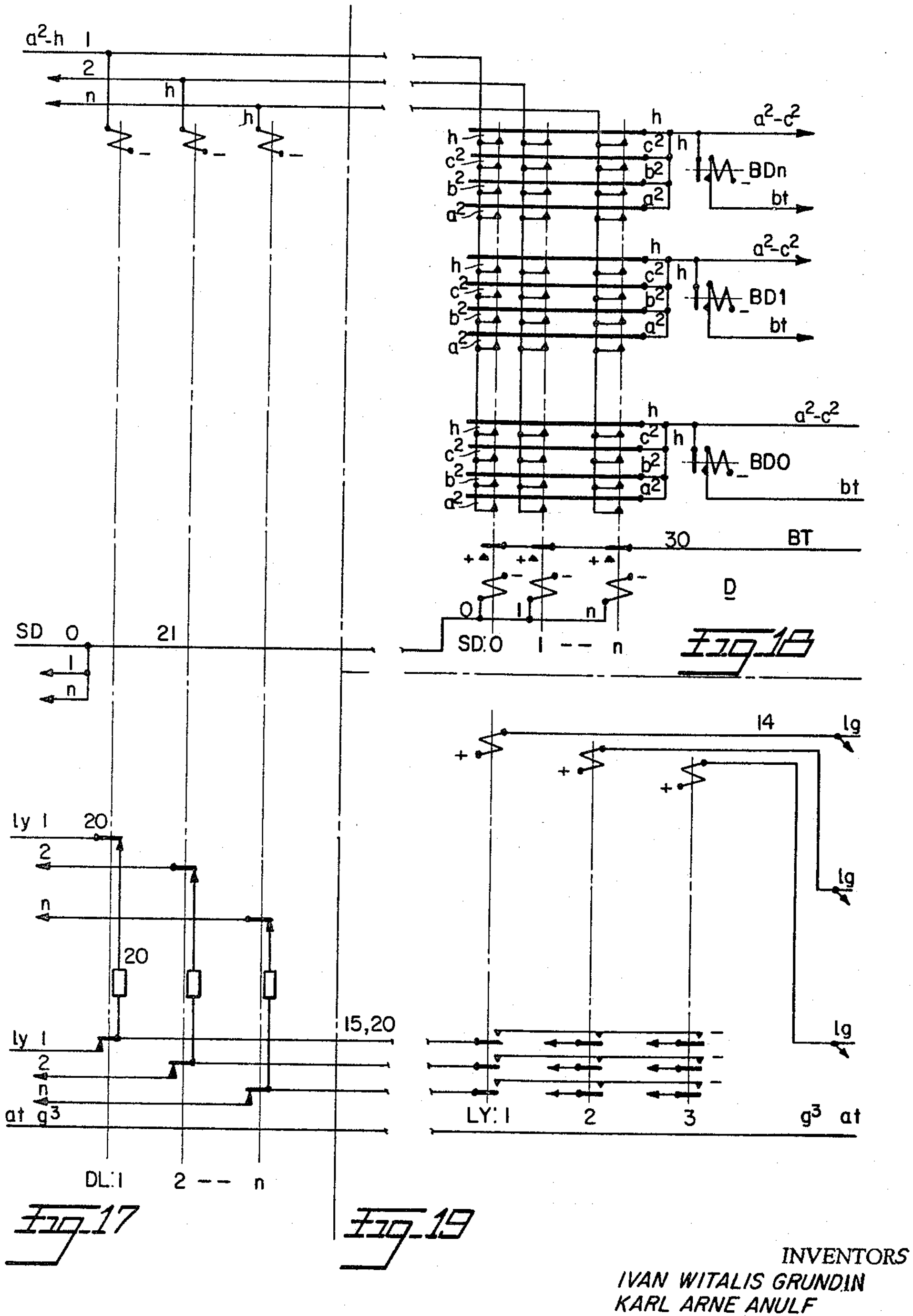

FIGURE 17 shows the link marking relays DL1–DL$n$ for the C-D-links. FIGURE 18 shows the D-stage of the selector. FIGURE 19 shows the test relays LY1–LY3.

Figures 20, 21:
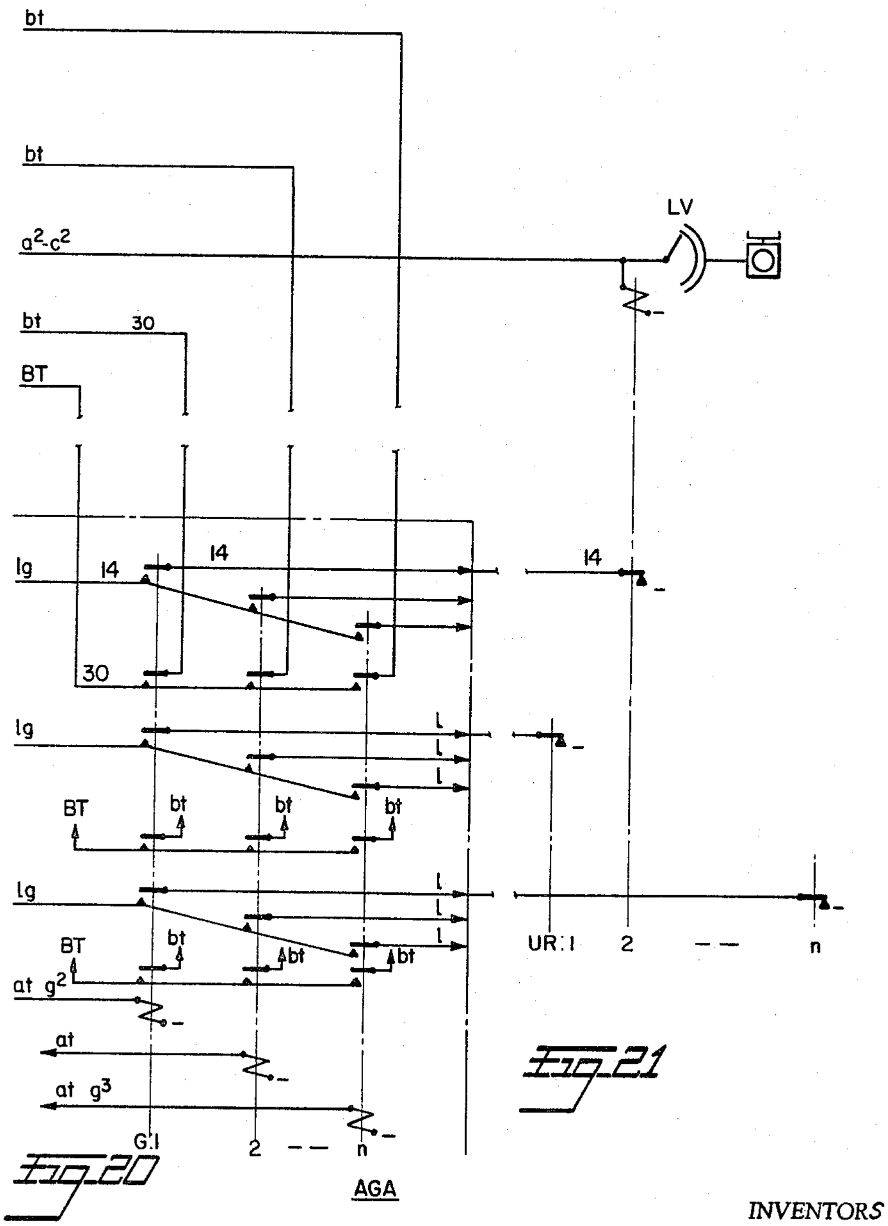

FIGURE 20 shows the address group indicator AGA with the address group relays G1–G$n$. FIGURE 21 shows diagrammatically a final selector LV with busy marking relays UR1–UR$n$.

In the following the arrangement and operation of the selector which replaces the group selector chain of prior switching systems, will be described in detail. The arrangement and operation for the described equipment is characteristic of the present invention and can be used with advantage even in other switching stages, for instance finder stages, combined line finder and final selector stages or combined line finder, group selector and final selector stages.

The setting up of a connection through the selector will now be described.

A subscriber Ab1, FIGURE 8, lifts his handset and is connected in known manner through the register finder RS to the register REG. The pulse receiving relay R1 (FIGURE 9) of the register is energized. Relay R2 is energized in circuit 1, and dialing tone Su is sent to the calling subscriber over circuit 12. The subscriber now dials the first digits of the wanted number.

The first pulse train (assumed to represent digit 1) steps the switch V1 to its second position over circuit 2. At the beginning of the first digit the switch V4 is energized in circuit 7, and after completion of the digit this switch steps to its second position and connects switch V2. Switch V2 is stepped by the second pulse train (assumed to represent digit 9) to its tenth position. When the pulse train is completed and the switch V4 is released, circuit 8 is closed, and relay R5 is energized. When a number of digits sufficient to identify the wanted outlet (address group) in the intermediate selector has been received, the connecting process is started by the application of positive potential to the *e*-wire.

Hereby start marking is applied to circuit 5 for energizing relay S2 in the cord circuit SR (FIGURE 8). Relay S2 closes a circuit 10 over wire $k$ for energizing the originating group indicating relay A1 in the inlet stage of the selector (FIGURE 11).

The address group marking relay G1 (FIGURE 20) in the D-stage is energized in circuit 9–9$^3$ over the wire AT.

For the sake of simplicity it has been assumed that the start marking in the described system is effected over one wire for each address group. However, the marking can be effected according to a decadic system, marking the tens and units of the group over 10 or fewer wires.

The address group relay G1 closes an energizing circuit 14 for the test group relays LY.

The test group relays now apply negative potential to the test wires $ly$ over circuits 15 and 20. The circuit passes through relays DL which mark idle links between the C- and D-stages. If a link is busy, the corresponding test circuit is broken. Negative potential is applied over circuit 15 to the winding of lock-out relay UBC1 (FIGURE 14) for the selection of a connecting path between stages B and C.

Relay A1 which marks the originating group (FIGURE 11), applies positive potential to the winding of relay UBC1 over a circuit 16 which extends over contacts on relay AL (FIGURE 12) indicating an idle link between stages A and B and contacts on the crossbar switch holding magnets BB (FIGURE 13), the latter contacts marking idle links between stages B and C.

The lock-out relay A4 in the A-stage (FIGURE 11) for indicating an idle link between stages A and B and the lock-out relay UBC1 (FIGURE 14) for indicating an idle link between stages B and C are now energized, thereby indicating an available circuit from A to C.

Relay StuAR1 for operating selecting magnets of the crossbar switches in the A- and B-stages is now energized in circuit 18 (FIGURE 14), and relay StuBR1 for operating selecting magnets of crossbar switches in the C- and D-stages is energized in circuit 19 (FIGURES 14 and 15).

The lock-out relay UD1 for indicating an idle link between stages C and D is now energized in circuits 20, 22, 19. Hereby selecting magnet SD0 in the D-stage (FIGURE 18) is energized in circuits 19, 22, 21, and selecting magnet SC0 in the C-stage (FIGURE 16) is energized in circuits 32, 22, 19.

Relay StuAR1 dependent upon the energized relay A4 now causes the operation of selecting magnet SB0 (FIGURE 13) over circuits 10, 23, 24, 25, and selecting magnet SA0 (FIGURE 11) over circuits 10, 23, 24, 26.

The holding magnet BA0 in the A-stage (FIGURE 10) is now energized in circuit 27, wire *h* and circuit 11. The holding magnet BB0 in the B-stage is energized in circuit 28 and holding magnet BC0 in the C-stage is energized in circuit 29.

Finally holding magnet BD0 in the D-stage is energized dependent upon address group relay G1 in circuit 30.

When all these holding magnets have been operated the $c^2$-wire is connected through the selector stages, and relay R6 in the register (FIGURE 9) is energized over the $c^2$-wire in series with relay UR in the final selector LV (FIGURE 21). Connecting relay S1 in the cord circuit (FIGURE 8) is now energized in circuit 6 whereby the $a^2$- and $b^2$-wires are connected through to the final selector at the same time as the connection to the register is interrupted and the relays of the register are released. Holding of the switches is then effected by relay S3 (FIGURE 8) in known manner. The relay set AGA is released when circuit 6 is broken by relay R2 and can now be used in setting up another connection.

The connection may of course be extended to a trunk or junction circuit to another exchange instead of to a final selector.

Since the number of lines in the address group is optional (one or more address group relays may be used), any desired line capacity can be obtained. An increase of the number of outgoing lines only requires the installation of additional switches in the D-stage, and this equipment can be utilized in common for different outlets. In the other stages an increase of the number of switches is necessary only to meet an increased traffic intensity. In a system according to the present invention there is no need of an abrupt increase in the amount of equipment as is the case in conventional systems when the number of group selector stages is increased.

In telephone systems it is advantageous to use so called shift-order connection between the B- and C-stages and between the subscriber's circuit and the intermediate selector.

The lock-out circuits may be arranged so that the order of operation is shifted for each connection. In such case a fault, e.g., a contact fault, in a lock-out circuit cannot have any adverse effect, at least not if the system is provided with timed supervision means which in the case of failure rapidly initiate a new connecting procedure with changed order of operation for the lock-out circuits. A new connection can then be set up in a fraction of a second.

The invention can also be applied to the subscriber's unit in which case the register sends information on the identity (number) of the subscriber involved to the primary subscriber's unit whereupon the extension of the connection is effected in a manner analogus to that described above. The connection can even be extended in this manner through the whole switching system from an incoming line to an outgoing line.

The system described above is given by way of example only and can be modified in various ways within the scope of the invention. Thus, for instance, the starting of the connecting procedure can be effected alternatively from the A-stage and the D stage in which case both the outgoing and incoming lines may terminate in the same stage. The start can also be effected simultaneously from both sides (A and D) and the testing can also be effected simultaneously from both sides. The system can also be provided with so called overflow facility so that if a wanted route is not available an outgoing auxiliary line is seized which is also terminated as an incoming line, and a new connection is set up through the selector system.

What we claim is:

1. A switching system for establishing connections between transmission lines in telecommunication systems or the like comprising a plurality of selector stages each including switching means with an expanding multiple side and means for dividing said selector stages into a series of two-stage groups including intermediate links for connect ing the expanding multiple side of the switching means in one selector stage in each group to the expanding multiple side of the switching means in the other selector stage in the group, the switching means in each said selector stage also having a concentrating outlet side selectively connectable to transmission lines and to the switching means in another group of selector stages; control means for completing a continuous route from at least one incoming line through said selector stages to at least one outgoing line to provide a connection therebetween, said control means comprising means responsive to a numerical input for marking at least one idle outgoing line terminating in the concentrating outlet of the switching means in one of said selector stages, means for marking at least one incoming line at the concentrating outlet of the switching means in a selector stage in one of said groups, means for marking available connections in the selector stages between those at which the connections to the incoming and outgoing lines are marked, and means responsive solely to the switching means in which connections are marked for completing the selected route from the incoming line through said selector stages to the outgoing line; and means for actuating said control means.

2. The system of claim 1, wherein the means for actuating the control means comprises register means and wherein said register means comprises means responsive to an input signal to the register means to actuate the means for marking the outgoing line and the means for marking the incoming line-switching means connection.

3. The system of claim 1, together with a lockout circuit means associated with each of said selector stages and means for so connecting said lockout circuit means into the system that the marking of an idle connecting path in a given selector stage is dependent upon the existence of an idle connecting path in a selector stage in series with the given selector stage.

4. The system of claim 3, wherein at least one means for connecting a lockout circuit means into the system includes test circuit means for ascertaining busy and idle connecting paths at a specified location in the system and means incorporated in the means for marking the idle output line for connecting said test circuit means to said lockout circuit means.

5. The system of claim 3, together with means for shifting the order in which the several lockout circuit means are actuated in successive transmission line connections made by the system.

6. The system of claim 1, wherein the means for marking an idle outgoing line includes means for marking a group of such lines.

7. The system of claim 1, wherein the several marking means are successively released following the actuation thereof, whereby said system is capable of beginning a transmission line connection while completing previously initiated connections, whereby plural connection sequences in different stages of progress may be handled simultaneously by said system.

8. A switching system for establishing connections between transmission lines in telecommunication systems or the like comprising a plurality of selector stages each including multiple switching means and means for dividing said selector stages into a series of two-stage groups including multiple intermediate links for the switching means in one selector stage in each group to the switching means in the other selector stage in the group, the switching means in each said selector stage also having terminal means connectable to transmission lines and to the switching means in another group of selector stages, and control means for completing a continuous route from at least one incoming line through said selector stages to at least one outgoing line to provide a connection therebetween, said control means comprising means for marking at least one idle outgoing line connected to the switching means in one of said selector stages, means for marking at least one incoming line at the switching means in a selector stage in one of said groups, means incorporated in said selector stages for marking available connections in the selector stages between those at which the connections to the incoming and outgoing lines are marked, and means responsive solely to signals carried by said incoming and outgoing lines for actuating said marking means.

9. A switching system for establishing connections between transmission lines in telecommunication systems or the like comprising a plurality of selector stages each including multiple switching means and means for dividing said selector stages into a series of two-stage groups including intermediate links for connecting the switching means in one selector stage in each group to the switching means in the other selector stage in the group, the switching means in each said selector stage also having terminal means connectable to transmission lines and to the switching means in another group of selector stages and control means for completing a continuous route from at least one incoming line through said selector stages to at least one outgoing line to provide a connection therebetween, said control means comprising means for marking at least one idle outgoing line connected to the terminal means of the switching means in one of said selector stages, means for marking at least one incoming line at the switching means in a selector stage in one of said groups, means for marking available connections in the selector stages between those at which the connections to the incoming and outgoing lines are marked, and means for releasing each said marking means as the connection selected by said marking means is established, whereby the sequence of steps necessary to complete a given connection can be initiated while previous connections are being completed.

References Cited

UNITED STATES PATENTS

| | | | |
|---|---|---|---|
| 2,543,003 | 2/1951 | Den Hertog | 179—18.7 |
| 2,753,399 | 7/1956 | Oberman | 179—18.7 |

KATHLEEN H. CLAFFY, *Primary Examiner.*

L. A. WRIGHT, *Assistant Examiner.*